March 6, 1934.  B. J. HASKINS  1,950,052

MOTOR ANALYZER

Filed Dec. 3, 1932   3 Sheets-Sheet 1

Inventor:
Butler J. Haskins,
By [signature]
Attys.

March 6, 1934.  B. J. HASKINS  1,950,052
MOTOR ANALYZER
Filed Dec. 3, 1932  3 Sheets-Sheet 2
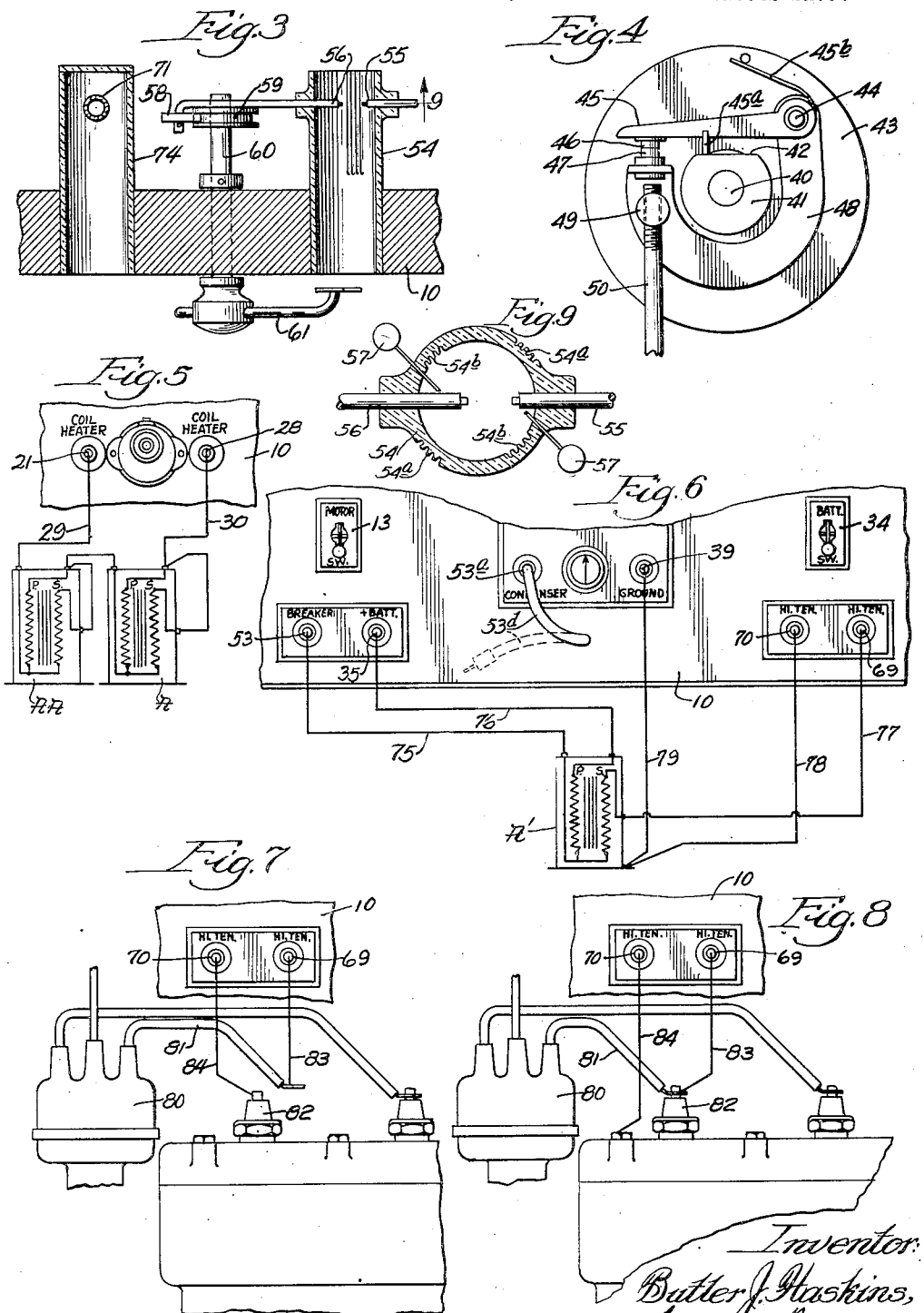
Inventor:
Butler J. Haskins,
By Banning & Banning
Attys.

March 6, 1934.  B. J. HASKINS  1,950,052
MOTOR ANALYZER
Filed Dec. 3, 1932   3 Sheets-Sheet 3
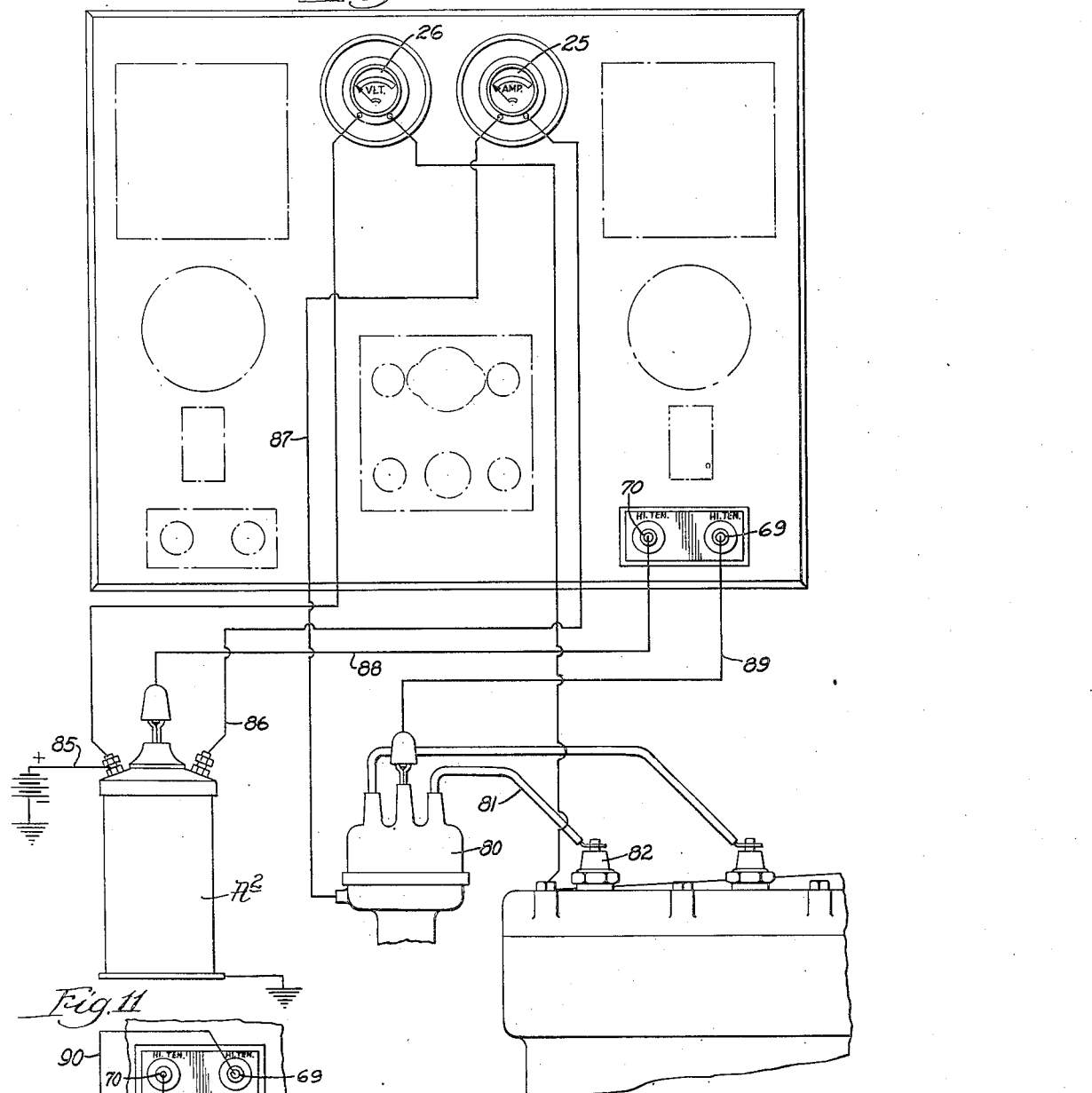
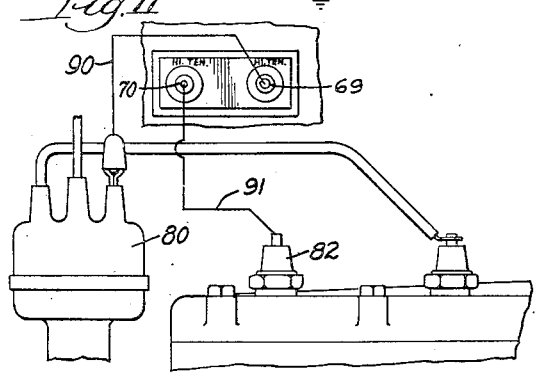
Inventor:
Butler J. Haskins,
By Manning & Manning
Attys.

Patented Mar. 6, 1934

1,950,052

UNITED STATES PATENT OFFICE 1,950,052

MOTOR ANALYZER

Butler J. Haskins, Chicago, Ill., assignor to Joseph Weidenhoff, Inc., Chicago, Ill., a corporation of Illinois Application December 3, 1932, Serial No. 645,521

27 Claims. (Cl. 175—183)

An object of this invention is to provide improved means for analyzing or testing ignition devices on automotive engines and the like.

Another object is to provide testing apparatus of this character which can be mounted on a panel which is carried on rollers and the like so that it can be readily moved alongside an automobile where the tests are made on the engine under working conditions.

Another object is to provide means for testing the spark coil of the automobile under conditions which simulate very closely actual operating conditions, such as different speeds of the car, temperature of the spark coil, while the car remains stationary and while the engine itself may be cold.

Still another object is to provide both auditory and visual means for checking the operation of the spark coil as well as of the spark plugs, high tension leads, etc.

These and other objects, as will hereinafter appear, are accomplished by this invention which is fully described in the following specification and shown in the accompanying drawings, in which—

Fig. 3 is a horizontal section on the line 3 of Fig. 2 showing an enlarged detail of the adjustable spark gap and of the neon tube;

Fig. 4 is an enlarged elevation of the primary circuit breaker;

Fig. 5 is a diagrammatic view showing the connection on the front of the panel for heating the spark coil prior to making a test thereon;

Fig. 6 is a similar view showing the same spark coil after being heated connected to the plugs on the front of the panel for testing said coil;

Fig. 7 is a diagrammatic view showing a high tension lead to a spark plug disconnected therefrom and connected to the high tension leads on the front of the panel so as to place the neon tube and adjustable spark gap in series with the spark plug;

Fig. 8 is a similar view showing the high tension lead connected to the spark plug, the spark plug and adjustable spark gap then being connected in parallel;

Fig. 9 is an enlarged section on the line 9 of Fig. 3; and

Figs. 10 and 11 show hook-ups similar to Fig. 7.

Figure 1:
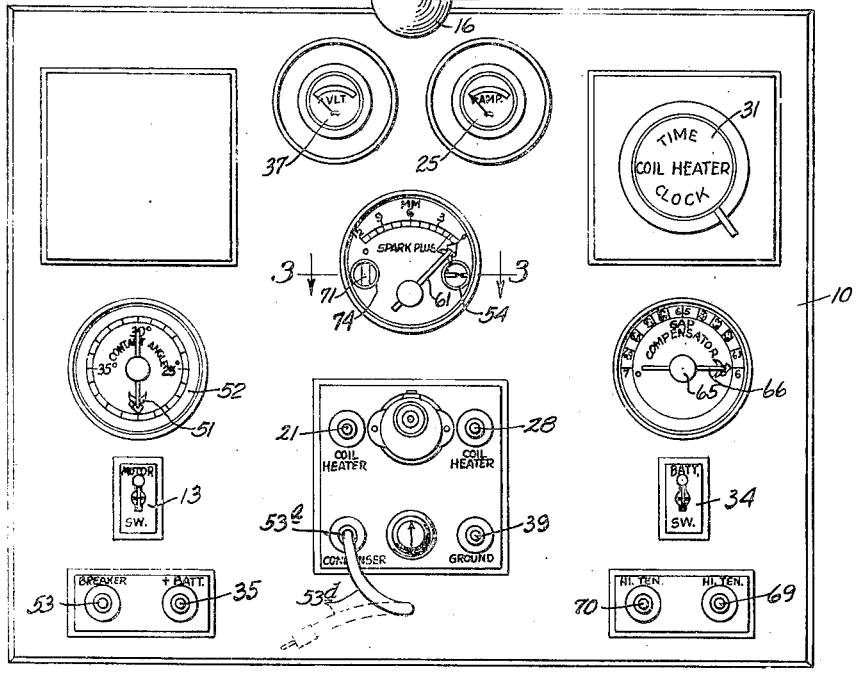
Figure 1 is a front elevation of a panel of a motor analyzer embodying the invention.

The embodiment illustrated comprises a panel 10 preferably mounted upon a suitable wheeled frame (not shown), said panel carrying the various instruments, indicating devices, and the like, which will be hereinafter described.

To the back of the panel is brought a 110 volt A. C. line 11 (Fig. 2) which passes through a fuse 12 and has a switch 13 through which it is connected to a synchronous motor 14 which is adapted to run at a uniform rate of say 1200 R. P. M., for a purpose later to be described. The line 11 also connects through leads 15 with an electric light 16 for illuminating the front of the board. A suitable switch (not shown) controls this light. The lead 15 also connects through a lead 17 with a clock-controlled switch 18. From this switch a lead 19 connects through the primary coil P of a transformer 20, and thence connects with the other lead 15 to complete the circuit.

The secondary S of the transformer 20 connects at one side with a plug 21 on the front of the board, the opposite end being connected through a lead 22 to the overload circuit breaker 23, thence through a lead 24 to the A. C. ammeter 25, and back through a lead 26 to a rheostat 27, and thence to a plug 28 on the front of the panel.

Figure 2:
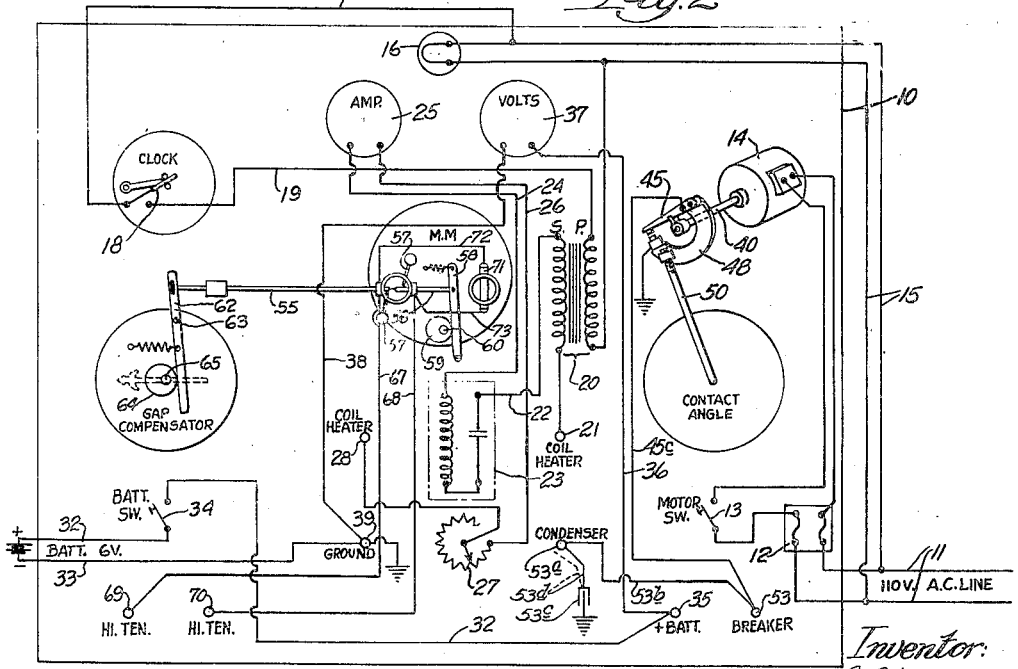
Fig. 2 is a wiring diagram showing the parts of Fig. 1 reversed as when the board is viewed from the rear.

When it is desired to make a test on a spark coil as A (Fig. 5), the terminals of the coil are connected through leads 29, 30 with the plugs 21, 28 of the panel, and a clockwork mechanism, shown in front elevation at 31 (Fig. 1) is started which at the same time closes the switch 18 of Fig. 2, thereby passing alternating current through the primary winding, and through transformer action a secondary current is induced in the secondary winding of the coil which is short circuited. For this purpose five amperes should be passed through the primaries of all six volt coils and three amperes through all twelve volt coils. The strength of this current is controlled by the rheostat 27.

As a check, standard six and twelve volt coils are supplied with the apparatus. A standard coil AA of the same voltage as the coil to be tested may also be connected in series, as shown in Fig. 5, so as to be heated simultaneously under substantially the same conditions. The coil A can thus be tested using the coil AA for comparison. The coil AA may be omitted, however, if desired.

During the heating stage the ammeter 25 should be constantly observed. If the overload circuit breaker 23 on the test panel opens before the switch 18, which latter switch is held closed during test by clock mechanism for a period say of five minutes, it indicates a short circuit in the coil. To double check under such conditions the circuit breaker 23 should be manually closed and the ammeter again observed. A current reading in excess of the load (3 to 5 amperes) as previously set by the rheostat 27 for the 12 or 6 volt coil under test, definitely indicates a shorted coil.

At the end of the time for which the clock is set, the switch 18 is automatically opened thereby and a bell is struck indicating that the coil is thoroughly heated and otherwise ready for final tests under coil conditions similar to those encountered in service after the engine has been run long enough to bring the coil up to its normal operating temperature.

Six volt current from a storage battery which is preferably carried by the frame adjacent the panel is led thereto through leads 32, 33, the lead 32 having a switch 34 therein. This lead goes to the plug 35 on the front of the panel which is the positive (+) battery connection. A lead 36 connects this plug with the D. C. voltmeter 37 which connects through a lead 38 with the ground plug 39, and thence back to the battery through the lead 33.

The synchronous motor 14 has a shaft 40 (Fig. 4) on which is securely mounted a cam 41 which has one or more flat faces 42. The shaft 40 rotates in a frame member 43 which carries a pin 44 on which is pivotally mounted a breaker arm 45 which carries a contact point 46 which engages a similar contact point 47 on the mounting plate 48, the latter being pivotally connected also on the pin 44. The plate 48 carries a stud 49 which has a screw-threaded hole through which passes an adjusting screw 50 which extends through the panel, and carries a point 51 which operates over a dial 52 which is graduated to indicate degrees of arc of the cam 41 during which the points 46 and 47 are in contact. The breaker arm has a finger 45ª which bears at all times upon the cam, being held thereagainst by means of a spring 45ᵇ.

It will be understood that as the speed of the engine crank shaft increases, the time during which the contacts of the primary circuit of the breaker or interrupter are in contact correspondingly decreases. The breaker or interrupter, shown in Fig. 4, is similar to that employed in the primary ignition circuits of an automobile. In this device, however, I prefer to keep the speed of the shaft 40 constant and to change the time during which current flows through the primary ignition circuit by changing the degree of the contact as above described. Thus, as the screw 50 is turned to the left the stud 49 and the point 47 are lifted, thereby decreasing the angular contact through which these points are in contact. As here shown, any further movement of the cam 41 in a counterclockwise direction will lift the arm 45, thereby breaking contact between the two points. A chart is supplied with this motor analyzer giving the settings of the pointer 51 which correspond to various operating driving speeds for each particular make and model of car.

The adjustable spark gap and visual indicator for use in the high tension side of the circuit will now be described. This consists essentially of a tube 54 of insulation (Figs. 3 and 9) inserted in the panel 10, and having metal points 55, 56 slidably mounted therein. Static removers 57 (Fig. 2) are screw-threaded so as to be adjustable to lie closely adjacent the members 55 and 56, but not in contact therewith, and these static removers serve to dissipate any static charge which might otherwise collect on these members and prevent a proper discharge at this gap. The tube 54, as shown in Fig. 9, is preferably formed from suitable insulating material and has a series of longitudinal grooves 54ª on the outside of the tube and grooves 54ᵇ on the inside. These prevent leakage of static charges around the tube.

The point 56 is connected to a lever 58 which bears against a cam 59 on a shaft 60, this shaft being operated by means of a finger 61 which moves across a dial which is graduated in terms of millimeter opening between the points. A chart giving the correct setting of this spark gap for various tests as applied to different makes and models of ignition apparatus is supplied with the motor analyzer. The spark produced across these points, other conditions being the same, will depend upon the voltage of the battery. Consequently, the point 55 is moved back and forth to correct for small changes in this voltage.

Referring now to Fig. 2, it will be seen that the point 55 is connected to a lever 62 which is pivotally mounted at 63 and bears against a cam 64 on the shaft 65. This shaft carries a pointer 66 which moves over a scale (Fig. 1) which is preferably graduated between 5.0 volts and 7.0 volts. The voltage of the battery being used to supply current to the coil being tested is shown on voltmeter 37 mounted on panel. The pointer 66 is set at the voltage of the supply battery so as to correct for variations therein.

The points 55, 56 (Fig. 2) are connected through leads 67 and 68, respectively, with the high tension plugs 69, 70. This provides a very accurate and efficient method for adjusting the spark gap between these points and by placing them in a tube, as here shown, the sharp snap of a high voltage discharge which occurs when a spark jumps is greatly emphasized so that it becomes clearly audible to one standing in front of the panel.

The mounting plate 48 is connected to ground, and the breaker arm 45 which is insulated therefrom is connected through a lead 45ᶜ with a plug 53 on the panel. This plug is also connected to another plug 53ª by means of a lead 53ᵇ, and the plug 53ª is connected to ground through a condenser 53ᶜ by means of a removable lead 53ᵈ. This lead is disconnected only in case the spark coil being tested has its own condenser built in.

It is also desirable to examine this discharge by means of a neon tube. This is done by connecting a neon tube 71 by means of leads 72, 73 with the leads 67, 68. The neon tube, as shown in Fig. 3, is placed in a tube 74 which is mounted in the panel 10, and which preferably is closed at the rear so as to form a pocket for the tube which is deep and rather dark so that the flash which occurs in the neon tube as each spark occurs is made clearly visible.

Having heated the spark coil A, as previously described, it is disconnected from the coil heater plugs 21, 28, and is then connected, as shown in Fig. 6, the two ends of the primary being connected through leads 75, 76 with the plugs 53 and 35 respectively. The free end of the secondary is then connected to the high tension plug 69 by means of a lead 77, while the other high tension plug 70 is connected through leads 78, 79 with the ground plug 39. The voltage of the storage battery is then read on the ammeter 37, after which the gap compensator 66 is set to correspond to this reading.

The operator then knowing the make and model of the coil to be tested obtains from the chart previously mentioned the correct setting of the millimeter scale of the indicator 61. If this is shown to be 4, for example, he sets the indicator at 4. He then closes the switch 13 starting the motor 14, and sets the pointer 51 of the dial 52 to correspond to the factory specifications at which it is desired to test the spark coil. This setting he also obtains from the chart, as previously explained.

With the motor 14 in operation, the primary current passing through the primary P of the spark coil A' and being made and broken by the breaker 45 induces in the secondary S of this same coil a high voltage current which produces a sharply defined blue spark between the points 55, 56. The strength and character of this spark is attested to by the sharpness of this spark and by the sound it produces. At the same time a flash is generated in the neon tube 71, and a single brilliant flash in this tube indicates a strong, hot spark. This indicates that the spark coil under test is functioning properly. On the other hand, a weak coil would be indicated by a weak flash in the neon tube, as well as a weak jump spark between the points 55, 56, or perhaps by a total absence of the spark. A shorted spark coil would give no flash whatever.

Having thus tested the spark coil, it is then used to test the distributor of the engine, and through this the spark plugs and the high tension leads thereto. In Fig. 7 the distributor 80 is connected in the engine in the usual way, with the exception that one of the high tension spark plug leads 81 is disconnected from the spark plug 82, and is connected through a lead 83 with the high tension plug 69, the other high tension plug 70 being connected through a lead 84 with the spark plug. The automobile engine is then run in the usual way under its own power.

For this test, the point 55 is reset to correspond to the voltage of the automobile battery, while the point 56 is set at a given distance, as indicated on a chart, this distance varying with different models of cars. Assuming that the plug 82 and the lead 81 are functioning properly, a single spark will occur at the points 55, 56, and a bright flash will occur in the neon tube 71. Should the lead 81, however, prove to be defective, as when the insulation breaks down, or acquires excessive capacity due to aging the insulation, and energy is transferred to adjacent leads, the flash in the neon tube will be much fainter, as will also the spark between the points 55, 56. If other leads are transferring energy to this same lead, secondary flashes will also occur in the neon tube in this test.

In Fig. 8, the high tension lead 81 is replaced on its spark plug 82, which is then connected through the lead 83 with the high tension plug 69, while the high tension plug 70 is grounded through the lead 84. The points 55, 56 are set as in Fig. 7. With the engine in operation as before, the character of the spark at the spark plug 82 is indicated, as previously described. For this test, the indicator 61 (Fig. 1) is set at 1.25 mm.

It will be apparent that I may replace the synchronous motor 14 of Fig. 2 with a variable speed motor which can be controlled by suitable means so as to vary the speed of the motor between desired limits. Thus without varying the contact angle at the breaker 45, the motor speed can be doubled and its speed shown by suitable means, as a tachometer connected thereto.

In Fig. 10 is a hook-up for testing the coil $A^2$ under normal operating conditions in the automobile with the engine idling. Battery current is supplied to the primary winding of this coil from the car battery through the ignition switch (not shown) and the lead 85 with the engine not running. This current passes through the coil and out through a lead 86 to the ammeter 25, thence through a lead 87 to the breaker points of the distributor 80, and thence to ground. The ammeter reading is an indication of the condition of the contact points of the distributor and of the primary winding. At the same time the voltmeter 26 shows the voltage across the primary winding of the coil $A^2$.

The secondary is connected through the high tension leads 88, 89 (the usual lead from the coil to the distributor being removed) to the center of the distributor 80, and the resulting impulses distributed to the spark plugs in the usual way by the distributor, and by means of a lead 81 to each spark plug. This is connected through the leads 89, 88 with the high tension plugs 69, 70, respectively, which connect as shown in Fig. 2 with the gap 55, 56 and the neon tube 71, as previously described. These indicate the quality of the spark delivered by the coil to the distributor.

For this test, the spark gauge is opened up to a maximum point at which the spark is satisfactory, i. e., at which it will fire without missing across the gap in the spark gauge, and the flashes in the tube 71 will be clear-cut, and not overlapping. This gap, as shown in millimeters by the pointer 66, is then compared with a table supplied with this motor analyzer showing the normal maximum gap for each model of car to be tested. If the reading is within 1.5 mm of this maximum of the table, the coil is regarded as satisfactory. The spark at each plug is then tested, as in Fig. 7, with the gap set 1 mm less than that found to be satisfactory in the above test shown in Fig. 10. If this spark (Fig. 7) is not satisfactory for each plug, the trouble is in (1) the distributor 80; (2) the lead 81; or (3) the plug 82.

The lead 81 can be tested for efficiency by removing it and connecting the lead 90 to its opening in the distributor cap, as shown in Fig. 11. High potential is then applied directly to the spark plug by a lead 91, and if a previously poor spark is now bright the lead 81 is at fault and should be replaced by a new one.

If, however, the trouble is in the distributor head, as where this head is cracked, a poor spark, or none at all, will occur at the points 55, 56 in the hook-up of Fig. 11. By removing the lead 91 from the plug 82 and grounding it on the cylinder head, the character of the jump spark at 55, 56 will indicate the condition of the distributor head 80. If the spark is weak or absent, this head is defective.

Thus it will be seen that I have provided an efficient means for testing ignition systems of automobile engines. There are numerous other tests possible by this apparatus, the ones discussed being only illustrative. All the parts of the ignition apparatus may be tested, many of them in actual operation. The fact that this apparatus is mounted on a panel enables it to be rolled to the side of an automobile to be tested, and renders the whole much more efficient in operation.

While I have shown and described but a few embodiments of my invention, it is to be understood that it is capable of many modifications. Changes, therefore, in the construction and arrangement may be made which do not depart from the spirit and scope of the invention as disclosed in the appended claims.

I claim:

1. In apparatus for testing ignition devices including a spark coil having primary and secondary windings, means adapted to be connected in series with the secondary winding for indicating the degree of energization thereof, means to energize the primary winding including a primary circuit and motor operated means to make and break the primary circuit, and means including calibrated means corresponding to cam angle at predetermined engine speeds operatively connected to said motor operated means for varying the duration of contact of the make and break means of the primary circuit.

2. In apparatus for testing ignition devices including a spark coil having primary and secondary windings, means adapted to be connected in series with the secondary winding for indicating the degree of energization thereof, means to energize the primary winding including a primary circuit and motor operated means to make and break the primary circuit, means including calibrated means corresponding to cam angle at predetermined engine speeds operatively connected to said motor operated means for varying the duration of contact of the make and break means of the primary circuit, and other means adapted to be connected in series with the primary winding for testing said coil including a source of alternating current to heat the same to normal operating temperatures of the coil.

3. In apparatus for testing ignition devices including a spark coil having primary and secondary windings, means adapted to be connected in series with the secondary winding for indicating the degree of energization thereof, means for energizing the primary winding said means including a breaker assembly having a breaker arm and points to make and break the primary circuit, a motor driven cam for operating said breaker arm, and means including calibrated means corresponding to cam angle at predetermined engine speeds operatively connected to said breaker assembly for varying the duration of contact of the breaker points.

4. In apparatus for testing ignition devices including a spark coil having primary and secondary windings, means adapted to be connected in series with the secondary winding for indicating the degree of energization thereof, means for energizing the primary winding, said means including a primary circuit a breaker assembly having a breaker arm and points to make and break the primary circuit, a motor driven cam for operating said breaker arm, and means including calibrated means corresponding to cam angle at predetermined engine speeds operatively connected to said breaker assembly for varying the duration of contact of the breaker points, the cam operating at a constant speed.

5. In apparatus for testing ignition devices including a spark coil having primary and secondary windings, means adapted to be connected in series with the secondary winding for indicating the degree of energization thereof, means for energizing the primary winding comprising a primary circuit, said last named means including a breaker arm and a relatively movable breaker point carrying plate to make and break the primary circuit, a motor driven cam for operating said breaker arm, and screw means operatively connected to said plate and having a pointer operable over a graduated scale, whereby the variation of contact of the breaker points is varied in accordance with the setting of said pointer.

6. In apparatus for testing ignition devices including a spark coil having primary and secondary windings, means adapted to be connected in series with the secondary winding for indicating the degree of energization thereof, means for energizing the primary winding comprising a primary circuit, said means including a breaker arm and a relatively movable breaker point carrying plate to make and break the primary circuit, a motor driven cam for operating said breaker arm, and screw means operatively connected to said plate and having a pointer operable over a graduated scale, whereby the variation of contact of the breaker points is varied in accordance with the setting of said pointer, the cam operating at a constant speed.

7. In apparatus for testing ignition devices including a spark coil having primary and secondary windings, a frame on which said apparatus is mounted having a control panel, a tube of insulating material mounted in said panel and open at one end, spark gap electrodes mounted and insulated from each other therein, means for connecting said electrodes in series with the secondary of said spark coil, means for energizing the primary of said coil including a primary circuit and motor operated means having breaker points to make and break the primary circuit, and means on said panel including calibrated means operatively connected to said motor operated means for varying the duration of contact of said breaker points in accordance with simulated predetermined engine speeds whereby the coil can be tested for said engine speeds.

8. In apparatus for testing ignition devices including a spark coil having primary and secondary windings, a frame on which said apparatus is mounted having a control panel, a tube of insulating material mounted in said panel and open at one end, spark gap electrodes mounted and insulated from each other therein, means for connecting said electrodes in series with the secondary of said spark coil, means for energizing the primary of said coil including a primary circuit and motor operated means including constant speed cam means and breaker points to make and break the primary circuit, and screw means rotatably mounted in said panel and including calibrated means, said means being operatively connected to said motor operated means for varying the duration of contact of said breaker points in accordance with simulated predetermined engine speeds whereby the coil can be tested for said engine speeds without changing the speed of the cam.

9. In apparatus for testing ignition devices including a spark coil having primary and secondary windings, means for energizing the primary winding with an interrupted unidirectional current comprising a primary circuit and motor operated means to make and break said circuit, means adapted to be connected in series with the secondary winding for indicating the degree of energization thereof, said means comprising spark gap electrodes insulated from each other and at least one being adjustably mounted, and means for adjusting said electrodes relatively to compensate for variations from a predetermined standard voltage including calibrations for said variations in voltage, said means being operable over a millimeter scale to also adjust said electrodes relatively for a gap setting at said predetermined standard voltage, whereby variations from the predetermined standard voltage are compensated for.

10. In apparatus for testing ignition devices including a spark coil having primary and secondary windings, means for energizing the primary winding with an interrupted unidirectional current comprising a primary circuit and motor operated means to make and break said circuit, means adapted to be connected in series with the secondary winding for indicating the degree of energization thereof, said means comprising spark gap electrodes insulated from each other and at least one being adjustably mounted, and means for adjusting said electrodes relatively to compensate for variations from a predetermined standard voltage including calibrations for said variations in voltage, said means being operable over a millimeter scale to also adjust said electrodes relatively for a gap setting at said predetermined standard voltage, whereby variations from the predetermined standard voltage are compensated for, and means including calibrated means corresponding to cam angle at predetermined engine speeds operatively connected to said motor operated means for varying the duration of contact of the make and break means of the primary circuit.

11. In testing apparatus of the class described, a tube of insulating material, spark gap electrodes mounted and insulated from each other therein, and a static remover comprising a metal ball extending outside the tube and having a reduced portion mounted adjacent one of the spark electrodes but insulated therefrom to prevent ionization of the air surrounding the electrode when a high potential is applied thereto.

12. In a testing apparatus of the class described, a tube of insulating material, spark gap electrodes adjustably mounted and insulated from each other therein, and a static remover comprising an adjustable member mounted adjacent each electrode but insulated therefrom and from each other, said member extending to a point outside of said tube.

13. In apparatus for testing ignition devices including a spark coil having primary and secondary windings, means adapted to be connected in series with the secondary winding for indicating the degree of energization thereof, means for energizing the primary winding, the last mentioned means including breaker points to make and break the primary circuit, one of said breaker points being movable, motor driven means adapted to operate the movable point to open and close the primary circuit at a substantially constant rate, means for moving the other of said points toward and from the movable point whereby the duration of contact of the points is varied, and a pointer operatively connected to the last mentioned means and movable over a graduated dial for indicating the position of the other of said points whereby the ignition devices can be tested for various engine speeds corresponding to various readings of the pointer on the graduated scale.

14. In apparatus for testing ignition devices including a spark coil having primary and secondary windings, means adapted to be connected in series with the secondary winding for indicating the degree of energization thereof, means for energizing the primary winding, the last mentioned means including breaker points to make and break the primary circuit, one of said breaker points being movable, motor driven means including a cam adapted to operate the movable point to open and close the primary circuit at a substantially constant rate, means for moving the other of said points toward and from the movable point whereby the duration of contact of the points is varied, and a pointer operatively connected to the last mentioned means and movable over a graduated dial for indicating the position of the other of said points in terms of the angle of movement of the cam during which the points are in contact whereby the ignition devices can be tested for various engine speeds corresponding to various readings of the pointer on the graduated scale.

15. In apparatus for testing ignition devices including a spark coil having primary and secondary windings, means adapted to be connected in series with the secondary winding for indicating the degree of energization thereof, means for energizing the primary winding, the last named means including a breaker arm carrying a contact, and a relatively fixed contact to make and break the primary circuit, a motor driven cam operating at constant speed for operating said breaker arm, and screw means operatively connected to the fixed contact and having a pointer movable over a scale graduated in terms of angle of movement of the cam during which the points are in contact corresponding to the settings of the relatively fixed contact whereby the coil may be tested under conditions obtaining at different equivalent engine speeds.

16. An apparatus for testing high tension ignition devices, comprising spark gap electrodes insulated from each other and at least one being adjustably mounted, and means for adjusting said electrodes relatively to compensate for variations from a predetermined standard voltage including calibrations for said variations in voltage, said means being operable over a millimeter scale to also adjust said electrodes relatively for a gap setting at said predetermined standard voltage, whereby variations from the predetermined standard voltage are compensated for.

17. An apparatus for testing high tension ignition devices, comprising spark gap electrodes insulated from each other and at least one being adjustably mounted, a neon tube in parallel with said electrodes, and means for adjusting said electrodes relatively to compensate for variations from a predetermined standard voltage including calibrations for said variations in voltage, said means being operable over a millimeter scale to also adjust said electrodes relatively for a gap setting at said predetermined standard voltage whereby variations from the predetermined standard voltage are compensated for.

18. An apparatus for testing high tension ignition devices, comprising spark gap electrodes insulated from each other and mounted for relative movement, means for adjusting one of said electrodes to compensate for variations from a predetermined standard voltage including calibrations for said variations in voltage, and means operable over a millimeter scale for adjusting the other electrode to effect a gap setting at said predetermined standard voltage, whereby variations from the predetermined standard voltage are compensated for.

19. In apparatus for testing ignition devices including a spark coil having primary and secondary windings, means to energize the primary winding including a primary circuit and means to alternately make and break said circuit, means adapted to be connected in series with the secondary winding for indicating the degree of energization thereof, and means for connecting the primary winding in an alternating current circuit for a predetermined time interval and indicating the value of the current passing through the windings during said time interval.

20. In an apparatus for testing ignition coils, clock-controlled circuit means for passing a heating current for a predetermined length of time through a coil to be tested, means connected in said circuit for indicating the value of the current passing through the coil under test whereby defects in the windings of the coil will be indicated, and means operable by the clock for indicating when the heating current is disconnected thereby.

21. Apparatus for heating a spark coil having primary and secondary windings in testing said coil, comprising means for passing an alternating current through the primary winding, means for cutting off the current after the passage of a predetermined time interval, and means adapted to be connected in series with said winding for indicating the value of the current passing therethrough during said time interval.

22. Apparatus for heating a spark coil having primary and secondary windings in testing said coil in an ignition circuit comprising means for passing an alternating current through the primary winding for a predetermined period of time, means for cutting off said current after the passage of the predetermined time interval, means for indicating when the heating current is cut off by said means, and means connected in the heating current circuit for indicating the value of the current passing through said winding.

23. The method of testing a spark coil which comprises passing an alternating current of a known amperage through the primary winding of said coil for a predetermined time interval to heat the same to normal operating temperature of the coil, measuring the passage of current passing through the winding during said time interval, passing a uni-directional interrupted current through the primary winding following the termination of said time interval, and observing the degree of energization of the secondary winding of said coil under test.

24. The method of testing a spark coil which comprises passing an alternating current of a known amperage through the primary winding of said coil for a predetermined time interval to heat the same to normal operating temperature of the coil, measuring the passage of current passing through the winding during said time interval, passing a uni-directional interrupted current through the primary winding following the termination of said time interval, varying the duration of current impulses in accordance with the simulated working conditions of the coil under predetermined engine speeds, and observing the degree of energization of the secondary winding of said coil under test.

25. The method of testing a spark coil comprising heating said coil simultaneously with a standard spark coil, and testing the two coils under substantially the same temperature conditions.

26. The method of testing a spark coil comprising heating said coil simultaneously with a standard spark coil by passing an alternating current of substantially the same amperage through both coils, and testing the two coils under substantially the same temperature conditions.

27. The method of testing a spark coil having primary and secondary windings in an ignition circuit comprising first passing an alternating current through the primary winding for a predetermined period of time thereby inducing a current in the secondary winding, short circuiting the secondary winding whereby the coil is heated, and indicating the value of the current passing through said winding during said period of time.

BUTLER J. HASKINS.